(12) United States Patent
Kuo

(10) Patent No.: US 7,019,800 B2
(45) Date of Patent: Mar. 28, 2006

(54) LIQUID CRYSTAL DISPLAY DEVICE

(75) Inventor: Chen Lung Kuo, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 0 days.

(21) Appl. No.: 10/310,860

(22) Filed: Dec. 6, 2002

(65) Prior Publication Data

US 2004/0017526 A1    Jan. 29, 2004

(30) Foreign Application Priority Data

Jul. 26, 2002    (TW) .............................. 91117234 A

(51) Int. Cl.
*G02F 1/1333*    (2006.01)

(52) U.S. Cl. ..................... 349/110; 349/153

(58) Field of Classification Search ................ 349/110, 349/96, 153, 178, 179, 93, 190
See application file for complete search history.

(56) References Cited

U.S. PATENT DOCUMENTS

| | | | |
|---|---|---|---|
| 5,263,888 A | | 11/1993 | Ishihara et al. |
| 5,724,107 A | * | 3/1998 | Nishikawa et al. ........... 349/38 |
| 5,877,831 A | * | 3/1999 | Leenhouts et al. .......... 349/113 |
| 6,268,896 B1 | * | 7/2001 | Takasaki et al. ............ 349/110 |
| 6,424,394 B1 | * | 7/2002 | Morii ........................ 349/110 |
| 2001/0007487 A1 | * | 7/2001 | Yoon et al. |
| 2002/0047963 A1 | * | 4/2002 | Youn et al. |

* cited by examiner

*Primary Examiner*—Dung T. Nguyen
*Assistant Examiner*—Thoi V. Duong
(74) *Attorney, Agent, or Firm*—Finnegan, Henderson, Farabow, Garrett & Dunner, L.L.P.

(57) ABSTRACT

A liquid crystal display device mainly includes a first substrate having a light-shielding matrix formed thereon, a second substrate, and a liquid crystal layer sandwiched between the first and the second substrates. The first substrate is attached to the second substrate by a light-cured sealant. The present invention is characterized in that the light-shielding matrix has at least one transparent area located at a position facing the interface between the light-cured sealant and the liquid crystal layer thereby allowing a radiation entering the liquid crystal display device from the first substrate to reach the light-cured sealant through the at least one transparent area of the light-shielding matrix.

11 Claims, 4 Drawing Sheets

LIQUID CRYSTAL DISPLAY DEVICE

BACKGROUND OF THE INVENTION

1. Field of the Invention

The present invention relates to a liquid crystal display (LCD) device, and more particularly to a liquid crystal display device using a light-cured sealant.

2. Description of the Related Art

First, a conventional liquid crystal display device 100 will be described with reference to FIGS. 1a and 1b. FIG. 1a is a perspective view of the conventional liquid crystal display device, and FIG. 1b is a sectional view taken along line 1b—1b of FIG. 1a. Referring to FIG. 1b, the conventional liquid crystal display device 100 includes a first substrate 102 (i.e., a color filter substrate) and a second substrate 104 (i.e., a thin film transistor substrate) disposed to face each other with a predetermined gap therebetween. A liquid crystal layer 106 is sandwiched between the substrates 102 and 104. The substrates 102 and 104 are affixed to each other by a sealant 107.

Referring to FIG. 1a, the thin film transistor substrate 104 includes: a plurality of parallel data lines 108 and a plurality of parallel gate lines 110 which are formed on the surface of a glass substrate 112 facing the liquid crystal layer 106; and thin film transistors (TFTs) 114 disposed at each of the intersections of the data lines 108 and the gate line 110. Each region defined by two adjacent data lines 108 and two adjacent gate lines 110 is provided with a pixel electrode 116 connected to the drain electrode of the corresponding TFT 114.

Referring to FIG. 1b, the color filter substrate 102 includes: a plurality of colored portions 118 on the surface thereof facing the liquid crystal layer 106 at positions corresponding to the pixel electrodes 116 of the thin film transistor substrate 104; and a counter electrode 120 formed over the colored portions 118. A light-shielding matrix (like black matrix) 122 is disposed between the adjacent colored portions 118.

The light-shielding matrix 122 is made of a light-blocking material or a light-absorbing material for absorbing external light and improving the contrast of a displayed image. As shown in FIG. 1b, the light-shielding matrix 122 disposed in the periphery of the liquid crystal display device 100 covers a portion of the sealant 107 such that light can't penetrate through it to reach the portion of the sealant.

Therefore, when a UV curable sealant is used to seal the liquid crystal display device 100, since a portion of the sealant 107 is (especially the interface between the liquid crystal layer 106 and the sealant 107) covered by the light-shielding matrix 122, the UV light is unable to reach the covered portion of the sealant 107 thereby resulting in incomplete curing thereof. Therefore, that uncured sealant will react with the liquid crystal layer and cause the latter to degrade in its performance as a liquid crystal material.

In the field of flat panel display, the two substrates may be affixed to each other with a thermosetting sealant. However, this method needs a relatively high curing temperature which the liquid crystal cannot tolerate, and therefore the step of curing the thermosetting sealant should be conducted prior to filling of the liquid crystal material.

However, in a newly proposed technique based on a one drop fill (abbreviated ODF) method disclosed in U.S. Pat. No. 5,263,888 to Ishihara et al., one of the substrates receives droplets of liquid crystal material prior to joining it with the other substrate. This greatly reduces the number of the manufacturing steps and increases the manufacturing efficiency. However, since the liquid crystal material is dropped prior to the step of sealing the two substrates, this method cannot use the thermal setting sealant but must use the UV curable sealant instead.

Therefore, in order to ensure that the UV curable sealant can be cured completely thereby preventing it from reacting with the liquid crystal material, the light-shielding matrix that blocks the sealant from light must be kept away from the sealant. But this means the redundant area outside the display region of liquid crystal panel will increase or the area of the display region will decrease if the area of the liquid crystal panel remains the same, either the former design or the latter design varies from the developing trend of the liquid crystal display device.

The present invention therefore seeks to provide a liquid crystal display device that overcomes or at least reduces the above-mentioned problems of the prior art.

SUMMARY OF THE INVENTION

It is an object of the invention to provide a liquid crystal display device which prevent deleterious mixing of the liquid crystal material with any potentially uncured sealants.

The liquid crystal display device according to a general aspect of the present invention mainly comprises a first substrate, a second substrate and a liquid crystal layer sandwiched between the first and the second substrates. The first substrate is attached to the second substrate by a light-cured sealant (e.g. a UV cured sealant). The first substrate has a light-shielding matrix (e.g. a black matrix). The present invention is characterized in that the light-shielding matrix has at least one transparent area located at a position facing the interface between the light-cured sealant and the liquid crystal layer thereby allowing a radiation that enters the liquid crystal display device from the first substrate to reach the light-cured sealant through the at least one transparent area of the light-shielding matrix. Since the sealant located around the interface is cured completely, even there is any other uncured sealant within the sealant, such uncured sealant will be kept from reacting with the liquid crystal material thereby assuring the performance of the liquid crystal material.

According to one embodiment of the present invention, the transparent area of the light-shielding matrix comprises a slit extending along the interface between the light-cured sealant and the liquid crystal layer.

According to another embodiment of the present invention, the transparent area of the light-shielding matrix has a saw-toothed outline According to a further embodiment of the present invention, the light-shielding matrix has a plurality of transparent areas arranged in a plurality of parallel columns wherein at least one column of the transparent areas is formed along the interface between the light-cured sealant and the liquid crystal layer. Preferably, the transparent areas in adjacent columns are arranged in a staggered configuration.

However, when the liquid crystal display device is in use, the light generated from the backlight will pass through the transparent area(s) of the light-shielding matrix thereby deteriorating the performance (for example, lower the contrast ratio) of the light-shielding matrix. Therefore, the present invention provides two solutions: 1) using a normally black mode liquid crystal display device comprising a pair of polarizers attached on the first and the second substrates respectively in a manner that the polarizers cover areas on the first and the second substrates facing the transparent area of the light-shielding matrix; and 2) forming an opaque pattern on the second substrate at a position corresponding to the transparent area of the light-shielding matrix.

The aforementioned opaque pattern preferably comprises an anti-reflection surface layer facing the first substrate in order to prevent the light scattered by the light-shielding matrix from being reflected from the opaque pattern to pass through the transparent area of the light-shielding matrix. The anti-reflection surface layer may be an oxidized metal film or may be formed of a refractory metal (e.g., Cr, Ta, Mo or Ti).

BRIEF DESCRIPTION OF THE DRAWINGS

Other objects, advantages, and novel features of the invention will become more apparent from the following detailed description when taken in conjunction with the accompanying drawings.

FIG. 1b is a sectional view taken along line 1b—1b of FIG. 1a;

DETAILED DESCRIPTION OF THE PREFERRED EMBODIMENT

Figure 1A:
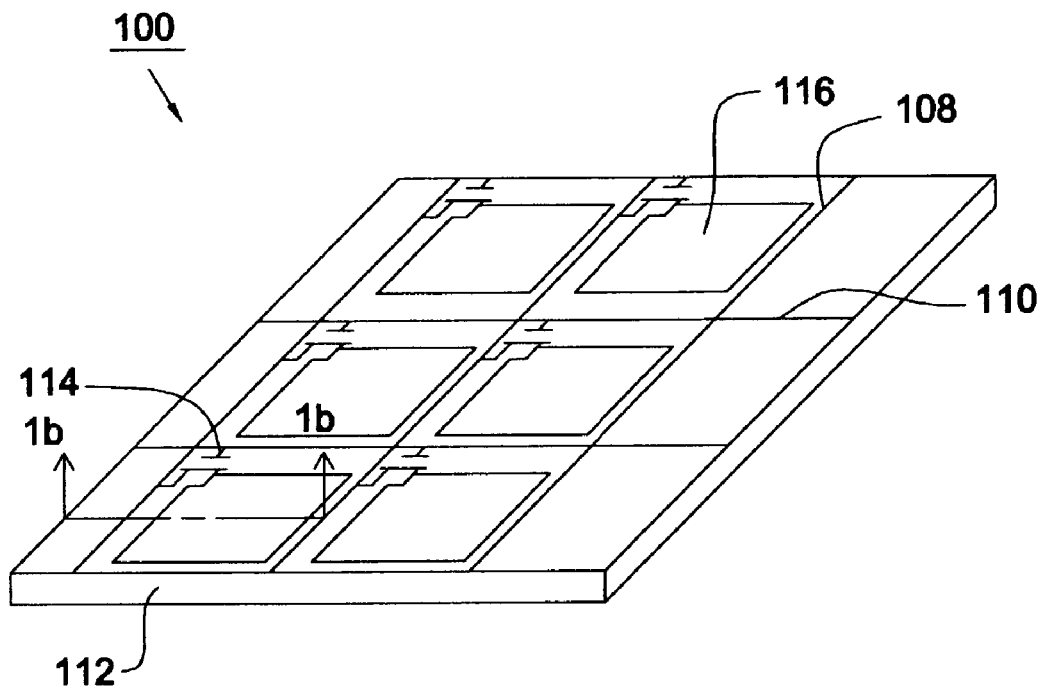
FIG. 1a is a perspective view of a conventional liquid crystal display device.
Figure 1B:
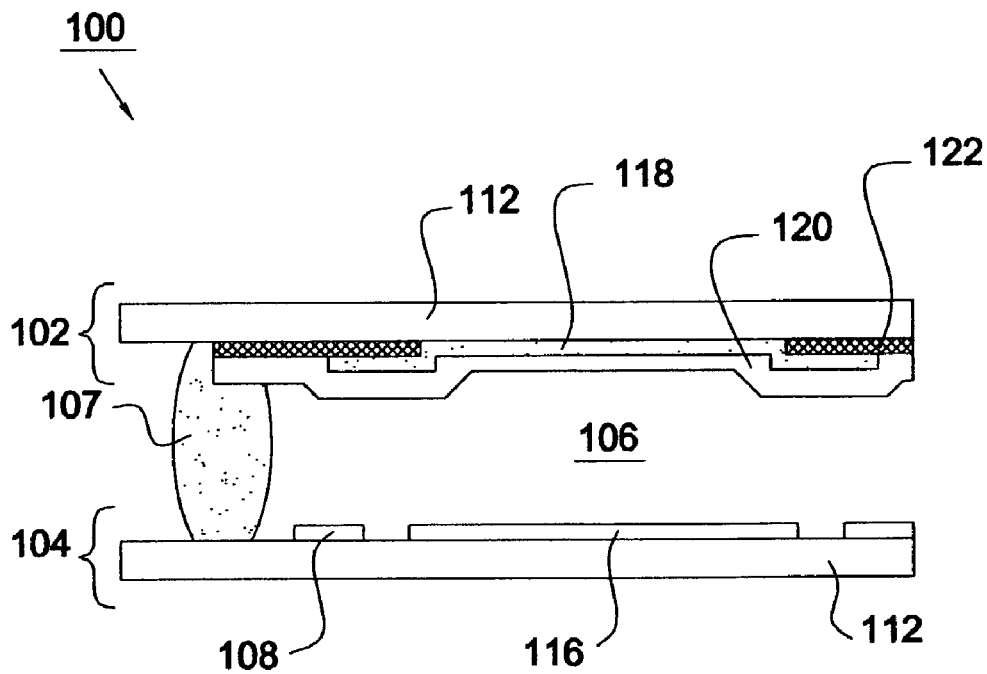
Figure 2:
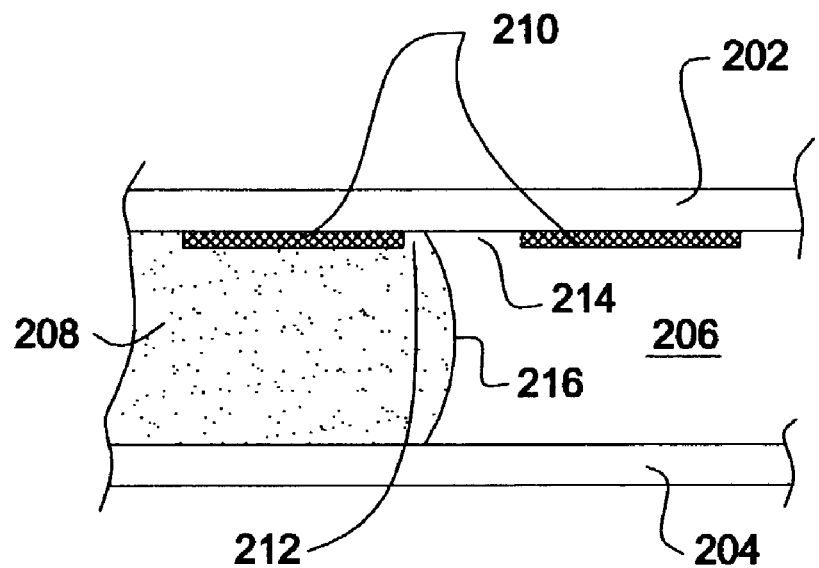
FIG. 2 is a sectional view of a portion of a liquid crystal display device according to a general aspect of the present invention.

FIG. 2 shows a liquid crystal display device according to a general aspect of the present invention mainly comprising a substrate 202, a substrate 204, a liquid crystal layer 206 sandwiched between the substrates 202 and 204, and a light-cured sealant 208 (e.g. a UV cured sealant) for attaching the substrate 202 to the substrate 204 and sealing the liquid crystal layer 206 therebetween. The substrate 202 has a light-shielding matrix 210 (e.g., a black matrix). The overlapping area between the light-shielding matrix 210 and the light-cured sealant 208 is designated by reference numeral 212. It is understood that the substrate 202 may be so-called color filter substrate, and the substrate 204 may be so-called thin-film transistor substrate.

The present invention is characterized in that the light-shielding matrix 210 has a transparent area 214 of the light-shielding matrix 210 formed at a position facing the interface 216 thereby allowing the sealant located around the interface 216 between the light-cured sealant 208 and the liquid crystal layer 206 to be cured completely. Since the sealant located around the interface 216 is cured completely, even there is any other uncured sealant within the sealant 208, such uncured sealant will be kept from reacting with the liquid crystal material thereby assuring the performance of the liquid crystal material.

Figure 3:
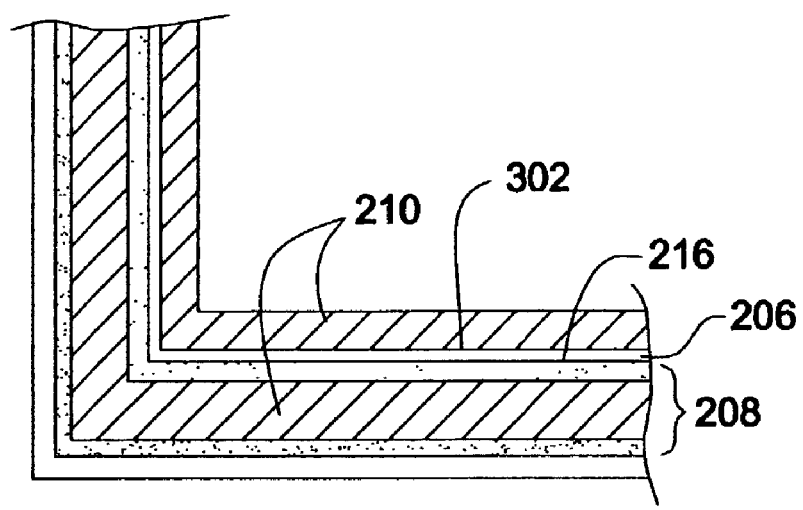
FIG. 3 is a top plan view of a portion of a liquid crystal display device according to a first embodiment of the present invention.

FIG. 3 shows a top plan view of the peripheral portion of a liquid crystal display device according to a first embodiment of the present invention. In this embodiment, the light-shielding matrix 210 has a slit 302 extending along the interface 216 between the sealant 208 and the liquid crystal layer 206 thereby allowing a radiation to enter the liquid crystal display device through the slit 302 and reach the sealant 208 located around the interface 216 such that the sealant 208 located around the interface 216 can be cured completely.

Figure 4:
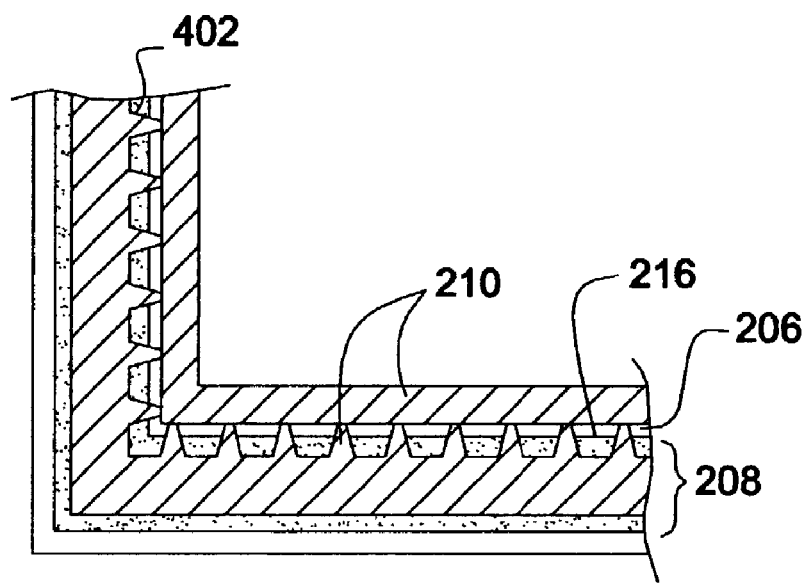
FIG. 4 is a top view of a portion of a liquid crystal display device according to a second embodiment of the present invention.

FIG. 4 shows a top view of the peripheral portion of a liquid crystal display device according to a second embodiment of the present invention. The light-shielding matrix 210 has a plurality of transparent areas 402 formed along the interface 216 wherein each of the transparent areas 402 has a saw-toothed outline.

Figure 5:
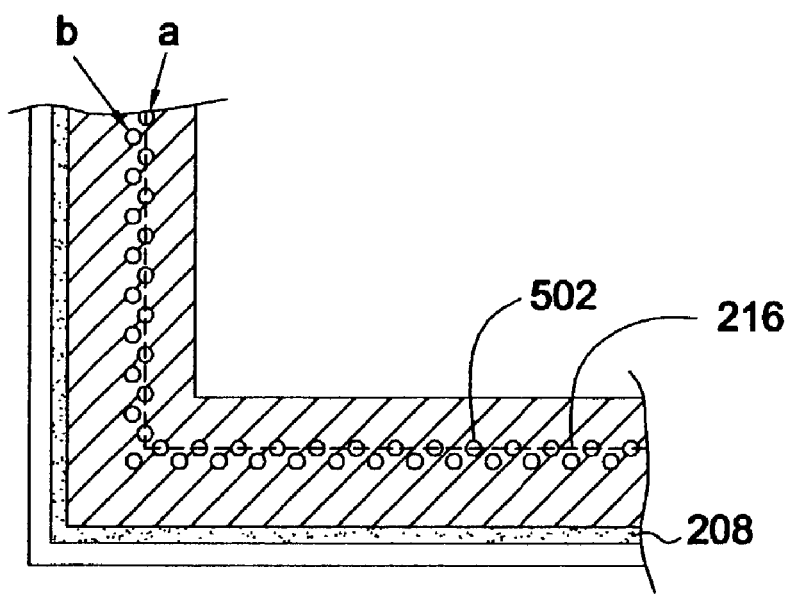
FIG. 5 is a top view of a portion of a liquid crystal display device according to a third embodiment of the present invention.
Figure 6:
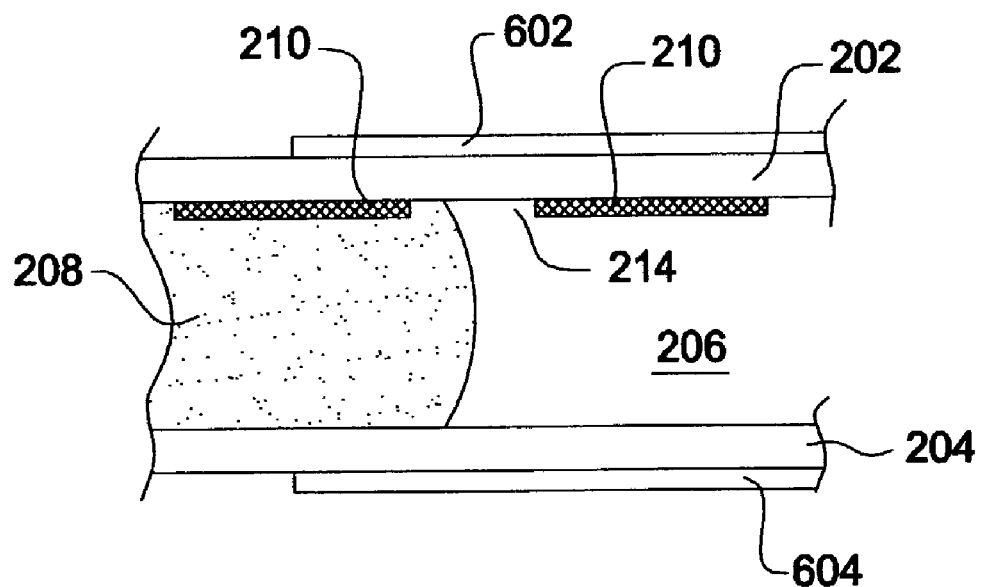
FIG. 6 is a sectional view of a portion of a liquid crystal display device according to a fourth embodiment of the present invention.

FIG. 5 shows a top view of the peripheral portion of a liquid crystal display device according to a third embodiment of the present invention. The light-shielding matrix 210 has a plurality of holes 502 arranged in a plurality of parallel columns wherein the holes arranged in the column designated with "a" extends along the interface 216. The holes in adjacent columns (i.e., a and b) are arranged in a staggered configuration. It should be noted that the liquid crystal display device is typically provided with a backlight generating light when the liquid crystal display device is in use. The light will pass through the substrate 204 and the liquid crystal layer 206, and then project from the substrate 202. The main purpose of the light-shielding matrix 210 is to reduce light leakage so as to improve the contrast of a displayed image. In order to prevent the light generated by the backlight from leaking out of the liquid crystal display device through the transparent area 214, the liquid crystal display device (see FIG. 6) according to a fourth embodiment of the present invention is a normally black mode liquid crystal display device comprising a pair of polarizers 602, 604 attached on the substrates 202, 204 respectively in a manner that the polarizers 602 and 604 cover areas on the substrates 202, 204 facing the transparent area 214 of the light-shielding matrix 210 thereby preventing the light passing through the transparent area 214 from leaking out of the liquid crystal display device. In the embodiment, when the liquid crystal layer 206 comprises a vertically aligned liquid crystal having a negative dielectric constant anisotropy, the polarization axes of the pair of polarizers 602, 604 are perpendicular to each other. In addition, when the liquid crystal layer 206 comprises a horizontally 90 degree twisted nematic liquid crystal having a positive dielectric constant anisotropy, the polarization axes of the pair of polarizers 602, 604 are parallel to each other.

Figure 7:
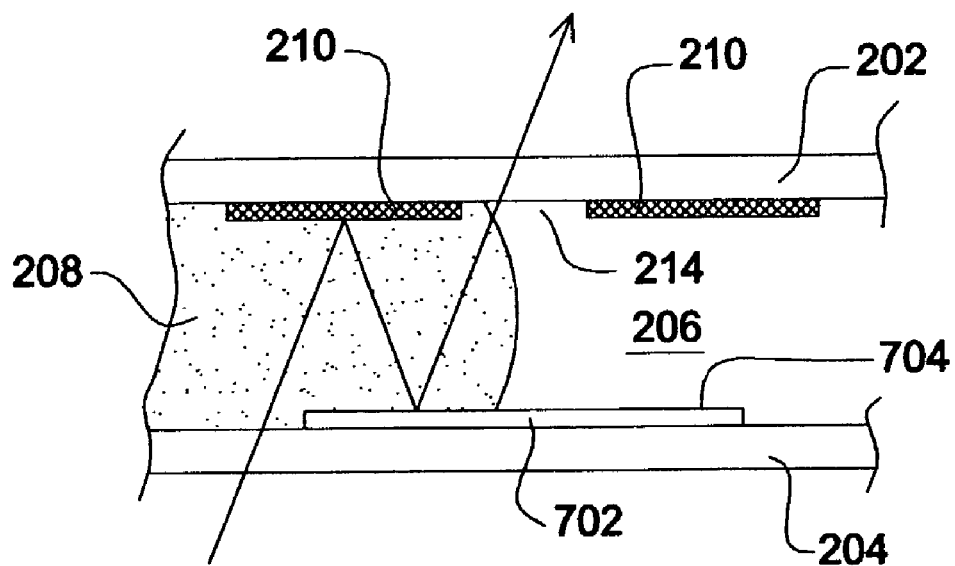
FIG. 7 is a sectional view of a portion of a liquid crystal display device according to a fifth embodiment of the present invention.

Furthermore, FIG. 7 shows a liquid crystal display device according to a fifth embodiment of the present invention. The liquid crystal display device is characterized in that the substrate 204 has an opaque pattern 702 formed at a position facing the transparent area 214 of the light-shielding matrix 210 such that the light generated by the backlight cannot directly pass through transparent area and go out of the liquid crystal display device. The opaque pattern 702 may be formed from the electrically conductive layer (e.g. M1 or M2) on the substrate 204. The opaque pattern 702 preferably comprises an anti-reflection surface layer 704 facing the substrate 202 in order to prevent the light (as shown by the arrow in FIG. 7) scattered by the light-shielding 210 from being reflected by the opaque pattern 702 to pass through the transparent area 214. The anti-reflection surface layer 704 may be an oxidized metal film or may be formed of a refractory metal (e.g., Cr, Ta, Mo or Ti). Alternatively, the anti-reflection surface layer 704 may be formed from an artificial black body. The so-called artificial black body is a porous hollow container which is made of refractory metal. When light is transmitted to the surface of the artificial black body, the light will enter the pores and multi-reflection will occur in the chamber such that a part of the energy of the light is absorbed in each reflection until the energy is absorbed completely.

Although the invention has been explained in relation to its preferred embodiment, it is to be understood that many other possible modifications and variations can be made without departing from the spirit and scope of the invention as hereinafter claimed.

What is claimed is:

1. A liquid crystal display device, comprising:
   a first substrate;
   a second substrate;
   a liquid crystal layer sandwiched between the first and the second substrates;
   a light-cured sealant for attaching the first substrate to the second substrate; and
   a light-shielding matrix formed on the first substrate,
   wherein the light-shielding matrix includes a slit extending along the interface between the light-cured sealant and the liquid crystal layer thereby allowing a radiation entering the liquid crystal display device from the first substrate to reach the light-cured sealant through slit, wherein the slit overlaps with only a portion of the light-cured sealant and exposes the interface between the light-cured sealant and the liquid crystal layer.

2. The liquid crystal display device as claimed in claim 1, wherein the second substrate further comprises an opaque pattern formed at a position facing the slit.

3. The liquid crystal display device as claimed in claim 2, wherein the opaque pattern comprises an anti-reflection surface layer facing the first substrate.

4. The liquid crystal display device as claimed in claim 3, wherein the anti-reflection surface layer is made of refractory metal.

5. The liquid crystal display device as claimed in claim 4, wherein the refractory metal comprises a metal selected from the group consisting of Cr, Ta, Mo, and Ti.

6. The liquid crystal display device as claimed in claim 3, wherein the anti-reflection surface layer is an oxidized metal film.

7. The liquid crystal display device as claimed in claim 1, wherein the light-cured sealant is a UV cured sealant.

8. The liquid crystal display device as claimed in claim 1, wherein the light-shielding matrix is a black matrix.

9. The liquid crystal display device as claimed in claim 1, wherein the liquid crystal display device is a normally black mode liquid crystal display device comprising a pair of polarizers attached on the first and the second substrates respectively in a manner that the polarizers on the first and the second substrates cover areas on the first and the second substrates facing the slit.

10. The liquid crystal display device as claimed in claim 9, wherein the liquid crystal layer comprises a vertically aligned liquid crystal having a negative dielectric constant anisotropy, and the polarization axes of the pair of polarizers are perpendicular to each other.

11. The liquid crystal display device as claimed in claim 9, wherein the liquid crystal layer comprises a horizontally 90 degree twisted nematic liquid crystal having a positive dielectric constant anisotropy, and the polarization axes of the pair of polarizers are parallel to each other.

* * * * *